(12) United States Patent
Fung et al.

(10) Patent No.: US 7,912,278 B2
(45) Date of Patent: Mar. 22, 2011

(54) USING CANDIDATES CORRELATION INFORMATION DURING COMPUTER AIDED DIAGNOSIS

(75) Inventors: Glenn Fung, Madison, WI (US); Balaji Krishnapuram, Phoenixville, PA (US); Volkan Vural, Watertown, MA (US); R. Bharat Rao, Berwyn, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 994 days.

(21) Appl. No.: 11/742,781

(22) Filed: May 1, 2007

(65) Prior Publication Data
US 2007/0280530 A1 Dec. 6, 2007

Related U.S. Application Data

(60) Provisional application No. 60/797,465, filed on May 3, 2006.

(51) Int. Cl.
*G06K 9/46* (2006.01)
*G06K 9/62* (2006.01)

(52) U.S. Cl. .......................... 382/159; 382/195; 382/224

(58) Field of Classification Search .................. 382/128, 382/159, 195, 224; 506/9; 715/751; 435/4, 435/5, 7.1, 6, 7.92, 7.93, 7.21; 436/501, 436/518; 424/185.1, 9.1; 536/23.1; 530/350, 530/300, 324, 325, 326, 327, 328; 375/E1.024; 514/12, 8, 13–16; 370/441
See application file for complete search history.

(56) References Cited

OTHER PUBLICATIONS

Vural et al., "batch classification with applications in computer aided diagnosis" Machine Learning ECML 2006, Lecture notes in computer science lecture notes in artificial intelligence ; LNCS, Springer, Berlin Heidelberg , BE, vol. 4212, Sep. 18, 2006, pp. 449-460).*

Vural et at, "Batch Classification With Applications in Computer Aided Diagnosis", Machine Learning; ECML 2006 Lecture Notes in Computer Science; Lecture Notes in Artificial Intelligence; LNCS, Springer, Berlin Heidelberg, BE, vol. 4212, Sep. 18, 2006, pp. 449-460.

Loog et al., "Supervised Segmentation by Iterated Contextual Pixel Classification", Pattern Recognition, 2002, Proceedings 16th International Conference on Quebec City, Que, Canada, Aug. 11-15, 2002, Los Alamitos, CA, USA, IEEE Comput. Soc., US, vol. 2, Aug. 11, 2002, pp. 925-928.

Schilam et al., "A Computer-Aided Diagnosis System for Detection of Lung Nodules in Chest Radiographs With an Evaluation on a Public Database", Medical Image Analysis, Oxford University Press, Oxford, GB, vol. 10, No. 2, Nov. 15, 2005, pp. 247-258.

(Continued)

*Primary Examiner* — Sheela C Chawan
(74) *Attorney, Agent, or Firm* — Joshua B. Ryan

(57) ABSTRACT

A method and system correlate candidate information and provide batch classification of a number of related candidates. The batch of candidates may be identified from a single data set. There may be internal correlations and/or differences among the candidates. The candidates may be classified taking into consideration the internal correlations and/or differences. The locations and descriptive features of a batch of candidates may be determined. In turn, the locations and/or descriptive features determined may used to enhance the accuracy of the classification of some or all of the candidates within the batch. In one embodiment, the single data set analyzed is associated with an internal image of patient and the distance between candidates is accounted for. Two different algorithms may each simultaneously classify all of the samples within a batch, one being based upon probabilistic analysis and the other upon a mathematical programming approach. Alternate algorithms may be used.

21 Claims, 12 Drawing Sheets

OTHER PUBLICATIONS

P.S. Bradley and O.L. Mangasarian, *Feature Selection via Concave Minimization and Support Vector Machines*, in J. Shavlik, editor, *Machine Learning Proceedings of the Fifteenth International Conference (ICML '98)*, pp. 82-90, San Francisco, California, 1998. Morgan Kaufman.

G. Fung and O.L. Mangasarian, *Proximal Support Vector Machine Classifiers*, in *Knowledge Discovery and Data Mining*, pp. 77-86, 2001.

Ben Taskar et al., *Max-Margin Markov Networks*, in *Advances in Neural Information Processing Systems 16*, S. Thrun et al. Eds. Cambridge, MA: MIT Press, 2004.

John Lafferty et al., *Conditional Random Fields: Probabilistic Models for Segmenting and Labeling Sequence Data*, in *Proc. 18th International Conf. on Machine Language*. San Francisco, CA: Morgan Kaufmann, 2001, pp. 282-289.

\* cited by examiner

USING CANDIDATES CORRELATION INFORMATION DURING COMPUTER AIDED DIAGNOSIS

PRIORITY AND CROSS-REFERENCE TO RELATED APPLICATION

This application claims priority under 35 U.S.C. §119(e) to provisional application Ser. No. 60/797,465, filed on May 3, 2006 and entitled "Using Candidates Correlation Information While Learning Classifiers for Computer Aided Diagnosis," which is incorporated herein by reference in its entirety.

BACKGROUND

The present embodiments relate generally to candidate classification. In particular, the present embodiments relate to classification of candidates of interest using internal correlations among the candidates.

Conventional classification methods may classify candidates of interest shown in medical images as being either normal or diseased. Conventional methods assume that the candidate samples are drawn independently and identically from an unknown data generating distribution.

In other words, typical classification methods may make the standard assumption that the data used to train and test the "classifier," such as a candidate classification algorithm, is independently and identically distributed. For example, candidate samples may be classified one at a time in a support vector machine (SVM). As a result, the classification of a particular test sample may not depend upon the features of any other test sample. However, the standard assumption may be commonly violated in many real world applications where sub-groups of samples have a high degree of correlation amongst both their features and labels.

Examples of the problems described above involve computer aided diagnosis (CAD) applications. With CAD applications, the goal may be to assist a physician with the detection of structures of interest shown within medical images, such as identifying potentially malignant tumors in computed tomography (CT) scans or X-ray images.

BRIEF SUMMARY

By way of introduction, the embodiments described below include methods, processes, apparatuses, instructions, or systems for providing batch classification of a number of related candidates, such as candidates shown within a medical image. Internal images of a patient may be acquired via various medical imaging techniques. A batch of candidates may be identified in one of the images as being of interest. Internal correlations and/or differences among the candidates may exist. The candidates may be classified and/or diagnosed taking into consideration the internal correlations and differences. For instance, one or more descriptive features of a candidate may be computed or otherwise determined. In turn, the feature(s) determined may be used to enhance the accuracy of the classification of some or all of the remaining candidates within the batch. Alternatively or additionally, the distance(s) between candidates shown within an image may be accounted for.

In a first aspect, a method classifies a candidate of interest within a medical image. The method includes (1) determining correlations and differences between locations of a subset of one or more candidates within an image, the subset either excluding or including the candidate of interest being classified and (2) determining correlations and differences between descriptive features of the subset of one or more candidates. The method also includes (3) classifying the candidate of interest using the correlations and differences determined in (1) and (2) along with a location and one or more descriptive features of the candidate of interest.

In a second aspect, a method classifies a candidate of interest within a medical image. The method includes determining correlations and differences between locations of a subset of one or more candidates within an image, the subset either excluding or including the candidate of interest being classified, and classifying the candidate of interest using the correlations and differences determined along with a location and one or more descriptive features of the candidate of interest.

In a third aspect, a data processing system classifies a candidate of interest within a medical image. The system includes a processor operable to determine correlations and differences between (1) locations of a subset of candidates within an image, the subset either excluding or including the candidate of interest being classified, and (2) descriptive features associated with the subset of candidates. The processor classifies the candidate of interest using the correlations and differences determined in (1) and (2) along with a location and at least one descriptive feature of the candidate of interest.

In a fourth aspect, a computer-readable medium having instructions executable on a computer is described. The instructions include (1) determining correlations and differences between descriptive features of a subset of one or more candidates shown in a medical image, the subset either excluding or including a candidate of interest shown in the medical images and (2) determining a location and one or more descriptive features of the candidate of interest. The instructions also include (3) classifying the candidate of interest using the information determined in (1) and (2).

The present invention is defined by the claims listed herein. Nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The present embodiments will become more fully understood from the detailed description given herein below and the accompanying drawings which are given by way of illustration only, and are not limitative of the present invention, and wherein.

DETAILED DESCRIPTION OF THE DRAWINGS AND PRESENTLY PREFERRED EMBODIMENTS

Figure 1:
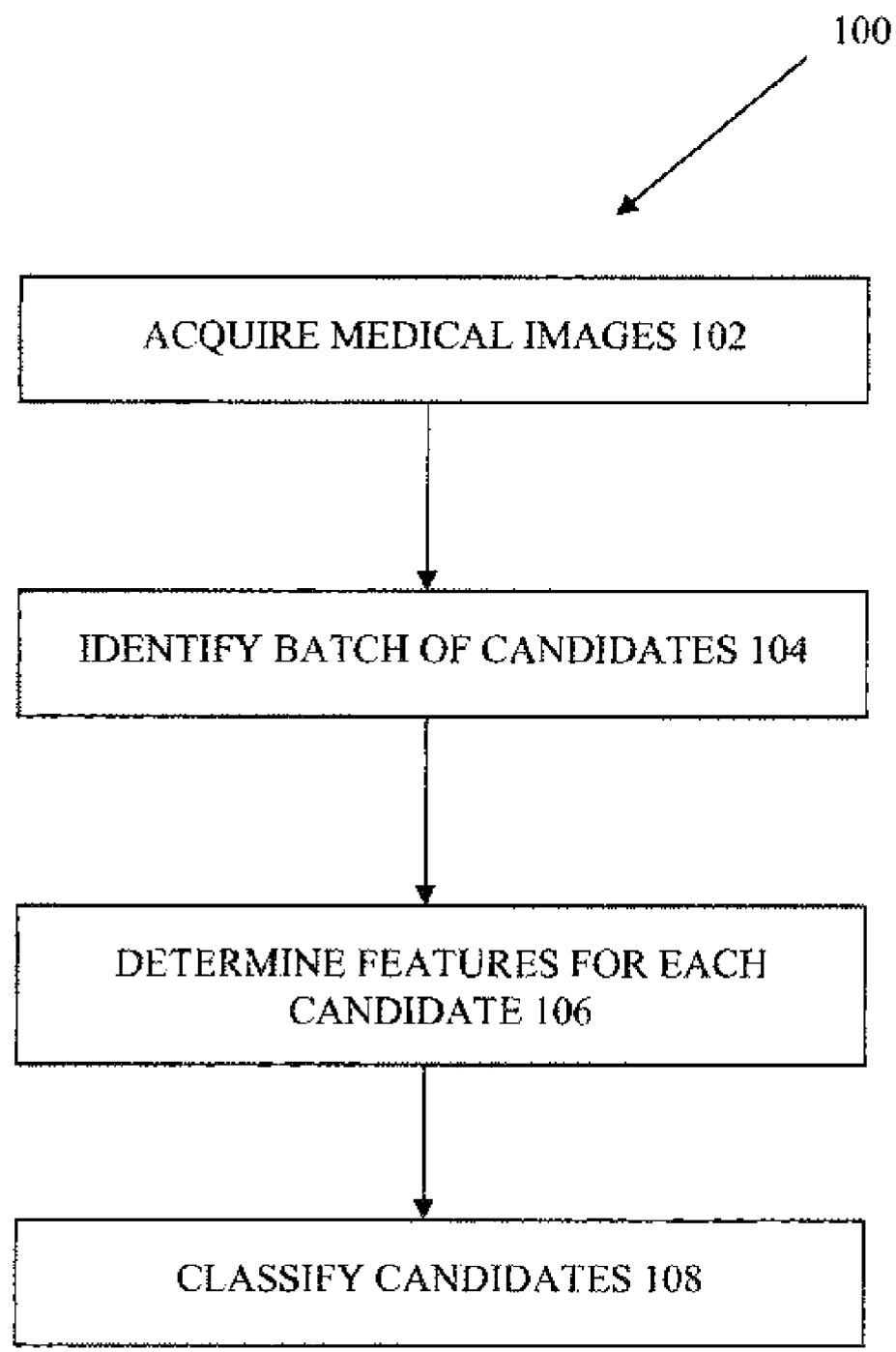
FIG. 1 is an exemplary method of batch classification accounting for internal correlations among the candidates to be classified.

A system and method provide for automatic classification and/or diagnosis of candidates of interest. A batch of candidates shown within a data set, such as an internal medical image, may be identified as being of interest. The feature(s) and location(s) of one or more of the candidates may be determined. The feature(s) and location(s) determined may be used to classify and/or diagnose some or all of the candidates within the batch. Classifying a batch of candidates by accounting for internal correlations and/or differences among the candidates may enhance the accuracy of the classification and/or diagnosis for each of the candidates within the batch.

Most conventional classification methods assume that the candidate samples to be analyzed are independent and unrelated. This assumption may fail with real world applications. In order to relax this standard assumption, the present embodiments consider the case where batches or groups of samples may have internal correlations (as well as differences), whereas the samples from different batches may remain considered to be uncorrelated. In one aspect, two algorithms classify all the samples in a batch jointly. One of the algorithms is based upon a probabilistic analysis and the other is based upon a mathematical programming approach. Alternate types of algorithms and models may be used for batch classification that takes advantage of internal correlations and/or differences among the candidates.

I. DATA IN THE MEDICAL DOMAIN

In one embodiment, a batch classification method may address different real-life computer aided diagnosis (CAD) problems. The method may significantly improve the accuracy of candidate classification as compared to a naive SVM classifier, which may ignore the internal correlations and differences among samples. The same probabilistic and mathematical algorithms discussed herein also may be used with other applications where the IID (independent and identically distributed) assumption is violated.

In general, CAD systems are becoming increasingly popular for medical screening, where they may be used to identify early disease among asymptomatic patients. As only a very small fraction of the screened patients will be unhealthy (e.g., cancer is found in roughly 4 in 1000 mammograms), CAD systems must have very high sensitivity to be clinically useful. Sensitivity is the number of patients diagnosed as having the disease divided by the number of patients that actually have the disease.

To avoid unnecessary and expensive follow-up on healthy patients, CAD systems also must have very high specificity. Specificity is the number of patients diagnosed as healthy divided by the number of healthy patients. In clinical practice, CAD systems are evaluated on the basis of a somewhat domain-specific metric: maximizing the fraction of positives that are correctly identified by the system while displaying at most a clinically acceptable number of false-marks per image.

Typically, the class distribution may be artificially balanced by collecting more diseased cases than would be obtained from a uniform, random sampling of the patients. Depending upon the disease, the so-called "ground truth" may be determined for each patient based upon either a more expensive and potentially invasive test (e.g., biopsy of breast lesions or colonoscopy for colon polyps) or a consensus opinion of a panel of expert radiologists for organs when a definitive test (e.g., lung biopsy) is deemed too dangerous. Conventionally, expert radiologist opinion may be required to mark the location, size, and extent of all "positive" regions within the images.

With the present embodiments, a CAD system may be designed to perform operations on a database of images during batch classification. The CAD system may entail at least two general operational stages: (a) candidate generation—automatically or manually identifying all potentially suspicious regions in with very high sensitivity, and (b) feature extraction—describing each such region quantitatively using a set of medically relevant descriptive features. For example, quantitative measurements based upon texture, shape, intensity, size, brightness, contrast, and other characteristics may be used to characterize any region of interest (ROT). Subsequently, the candidate ROIs may be assigned class labels based upon the overlap and/or distance from any radiologist-marked or automatically identified diseased region.

The present embodiments also may employ a CAD other software application to determine correlations and/or differences between the descriptive features of a batch or subset of candidates shown within an image. Additionally, correlations and/or differences between the locations of the subset of candidates may be determined. The CAD program may use the correlations and/or differences of the locations and/or descriptive features of the subset to classify a candidate of interest. A location and/or the descriptive features of the candidate of interest also may be determined and used in the classification or diagnosis process. For instance, the locations and/or descriptive features of the subset, or the correlations and/or differences thereof, may be compared with the locations and/or descriptive features of the candidate of interest, respectively.

Beyond the domain of CAD applications, the embodiments discussed herein are quite general, and may be used for batch-wise classification problems in many other contexts. The proposed classifiers may be used whenever data samples are presented in independent batches. In the CAD example, the batch corresponds to the candidate ROI from a test or single internal image. However, in other contexts, a batch may correspond to data from the same hospital, the patients treated by the same doctor or nurse, or other data groupings.

Although not in the CAD setting, other limited joint classification work has been done in the field of natural language processing (NLP), where conditional random fields (CRF) and maximum margin Markov (MMM) networks "identify part of speech" information about words by using the context of nearby words. CRF also may be used in spoken word recognition applications.

However, CRF and MMM are both computationally very demanding and may be difficult to implement for problems where the relationship structure between the samples is in any form other than a linear chain (as in text and speech processing applications). Hence, their application in large scale medical applications, where run-time requirements are quite severe, would almost certainly be very difficult. For example, with the CAD applications used in the exemplary experiments discussed herein, the run-time of the testing phase may have to be less than a second in order to be practical and not waste the time of the end user, such as a radiologist or other medical personnel.

In one embodiment, a probabilistic model for the batch classification of samples may be employed. Alternatively, a mathematical programming approach may be employed. Other models and algorithms may be used for batch classification, such as neural network, non-linear, polynomial, regression, or other techniques. The models and algorithms may determine correlations and/or differences between the descriptive features and/or the locations of a subset of candidates.

Unlike the previous methods, such as CRF and MMM, both the probabilistic model and mathematical programming approach may be relatively easy to implement for arbitrary correlation relationships between samples. The probabilistic model and mathematical approach may be implemented to run fast enough to be viable in commercial CAD products. As discussed below, experimental evidence from different CAD problems demonstrates that these may be more accurate in terms of the metrics appropriate to CAD, as compared to a naive SVM.

II. BATCH CLASSIFICATION METHOD

In one aspect, a method classifies a candidate of interest within a medical image. The method includes (1) determining correlations and/or differences between locations of a subset of one or more candidates within an image, the subset either excluding or including the candidate of interest being classified and/or (2) determining correlations and/or differences between descriptive features of the subset of one or more candidates. The method may also include determining a location and/or one or more descriptive features of the candidate of interest. After which, the method may include (3) classifying the candidate of interest using the correlations and/or differences determined in steps (1) and/or (2) above, along with a location and/or one or more descriptive features of the candidate of interest. For instance, a location and/or a descriptive feature of the candidate of interest may be compared to any correlations and/or differences determined in steps (1) and/or (2).

FIG. 1 illustrates an exemplary method of batch classification that accounts for internal correlations among the candidates to be diagnosed. The method 100 may include acquiring medical images 102, identifying a batch of candidates 104, determining features of the candidates 106, and batch classifying the candidates 108. The method may include additional, fewer, or alternative actions.

The batch classification method 100 may involve acquiring one or more medical images internal to a patient 102. The medical images may be acquired by various medical imaging systems that employ imaging processes that produce images or scans of the patient.

In general, the types of imaging processes used to produce patient images or scans of internal regions of interest may include radiography, angioplasty, computerized tomography, ultrasound, and magnetic resonance imaging (MRI). Additional types of imaging processes that may be used include perfusion and diffusion weighted MRI, cardiac computed tomography, computerized axial tomographic scan, electron-beam computed tomography, radionuclide imaging, radionuclide angiography, single photon emission computed tomography (SPECT), cardiac positron emission tomography (PET), digital cardiac angiography, and digital subtraction angiography (DSA). In one embodiment the batch classification method may begin by acquiring one or more medical images (such as CT scans, MRI, X-ray, PET, or other images) from the archives of a medical institution that routinely screens the patient for colon, lung, breast, or other types of cancer. Alternate imaging processes may be used.

The batch classification method 100 may include identifying a batch of candidates to be classified that are contained within an internal image of a patient 104. The candidates to be classified and/or diagnosed may be regions of interest, suspicious items, or other areas shown within an image. A batch may be defined as a set of possibly correlated samples that occur together naturally. In one embodiment, the batch may be a set or subset of all candidate locations from an image of the same patient. Correlations and/or differences between the locations of the set or subset of one or more candidates within the image may be determined, the set or subset may exclude or include the candidate of interest being classified. The correlations and/or differences between the locations may represent the distances between the locations of the candidates. For instance, the likelihood that a classification of one candidate is the same as the classification of another candidate may be a function of the distances between the two candidates. Other batches may be defined.

The goal of a CAD application employed may be to detect structures of interest shown within an image. In one aspect, the CAD application may use a three-stage method: (1) identification of potentially unhealthy candidate regions of interest from a medical image, including identification of the candidate locations, (2) computation of descriptive features for each candidate, and (3) classification and/or diagnosis of each candidate (e.g., normal or diseased) based upon the features and/or locations computed.

As discussed above, the CAD algorithm may detect potentially diseased candidate regions within a medical image, such as a CT image of a lung. After candidate identification, the candidates or candidate regions may be highlighted, such as by superimposing circular marks encompassing the candidates on a display of the image. Within the displayed image, there may be a number of candidates and/or candidate regions emphasized.

The batch classification method 100 may determine the features or characteristics of each candidate within the batch 106. Descriptive features of each candidate may be automatically extracted by the CAD application. The features of the candidates that are determined by the CAD application may involve quantitative measurements performed upon the image data, such as by pixel-by-pixel, region, or other image analysis. The pixels or other image data associated with a candidate may be analyzed to compute a numerical or other measurement of the candidate associated with the texture, intensity, contrast, brightness, color, size, shape, and other characteristics of the candidate and/or corresponding region of interest.

The correlations and/or differences between the descriptive features of various candidates may be related to the likelihood that a classification of one candidate is the same as or similar to the classification of another candidate. For example, candidates that have similar or the same quantitative measurements for various descriptive features may have a same classification. Therefore, the classification of a candidate may be a function of the descriptive features of one or more other candidates. In one aspect, the classification of a candidate of interest may be a function of the differences and/or correlations of the locations anti/or the descriptive features of either all or some of the candidates within a subset of candidates.

In one embodiment, the CAD application may compute a number associated with one or more features for each candidate. Each numerical measurement may be viewed as a sliding scale related to the level of the corresponding feature, such as a sliding scale of grayness for x-ray images. In another embodiment, the CAD application may automatically leaf through a series of related images of the patient for more accurate feature computation. For instance, the CAD application may analyze a series of images of the patient's lungs to analyze progressions or spatial variations of one or more of the candidates shown within the images.

The batch classification method 100 may involve the classification of one or more of the candidates 108. After the features of one or more candidates are determined, each candidate may be classified or "labeled" as either healthy or unhealthy, or positive or negative. Other labels and classifications may be used.

All of the candidates within a batch may be simultaneously classified using the descriptive feature and/or location information computed associated with one or more of the candidates within the same batch. For instance, one candidate's measured features may be used to enhance the classification of one or more of the remaining, candidates within the batch. Alternatively, all of the feature information computed for every candidate may be used to enhance the accuracy of the classification of all of the candidates within the batch. The batch classification may account for the distance between candidates (i.e., candidate location), such as by weighting coefficients applied to the feature measurements, between each respective pair of candidates (as the candidates closer to a diseased candidate are more likely to also be diseased).

The method may correlate candidate information in a number of manners. The correlations may include similar features and/or classifications of the candidates, such as similar size, shape, or descriptive characteristics or whether the candidate is healthy or diseased. The correlations also may include similar or relatively "near" candidate locations, such as candidates within a same region of an image. Likewise, the method may account for differences between candidate features, classifications, and/or locations/regions. The correlations and differences between the locations may be implemented as a sliding scale based upon the distance between each of pair of candidates, or be based upon whether or not a pair of candidates each belongs to the same region. Other correlations and differences between candidate locations may be used to enhance the classification of a candidate of interest.

In one aspect, the method may classify and/or diagnose a first candidate associated with an internal image and automatically classify and/or diagnose a second candidate or a batch of candidates associated with the internal image as a function of the classification and/or diagnosis of the first candidate. Alternatively, the method may identify a batch of candidates associated with an internal image and automatically compute a descriptive feature associated with a first candidate within the batch of candidates. Then the method may simultaneously classify each remaining candidate within the batch of candidates accounting for the descriptive feature of the first candidate. Other batch classification techniques may be used.

As an example, the method may simultaneously classify a batch of candidates associated with an internal image accounting for or based upon a feature of a classified candidate associated with the internal image. The classification may relate to diagnoses. Or the method may include simultaneously classifying a batch of candidates shown within an internal image by accounting for at least one correlation between the features and/or locations among the batch of candidates. The method may be accomplished via a processing unit or computer readable instructions.

Under the identified paradigm, there may exist a correlation among both the specific features and the overall labels of some or all of the candidates belonging to the same batch. Correlations may exist in both a training data set and in the unseen testing data. Further, the level of correlation between all candidate pairs associated with an image may not be the same. The level of correlation between candidates may be a function of the pair wise distance between them.

The disease status of a candidate may be highly correlated with the healthy/unhealthy status (class-label) of other spatially proximate candidates. The correlations may decrease as the distance increases between candidates. Most conventional CAD algorithms may classify one test candidate at a time, ignoring the correlations among the candidates in an image. However, by explicitly accounting for the correlation structure between the labels of the test samples, the present embodiments may dramatically improve the classification accuracy of the candidates.

Within the medical domain, another application relates to automated heart wall motion analysis. To address this problem, whether each of the segments of the human heart wall is moving in a healthy way may be diagnosed. Features may be extracted from echo graphic images to describe each segment of the heart wall, and each segment may be classified independently, ignoring the correlations between segments. However, by accounting for the correlations between the different heart wall segments, as well as the features and/or labels of each segment, all of the segments may be diagnosed more accurately.

Some of the notations as used below follow. The notation $A \in R^{m \times n}$ will signify a real m×n matrix. For such a matrix, A will denote the transpose of A, and $A_i$ will denote the i-th row of A. All vectors will be column vectors. For $\chi \in R^n$, $\|\chi\|_p$ denotes the p-norm, p=1, 2, ∞. A vector of ones in a real space of arbitrary dimension will be denoted by e. Thus, for $e \in R^m$ and $y \in R^m$, e'y is the sum of the components of y. A vector of zeros in a real space of arbitrary dimension will be denoted by 0. A separating hyper-plane, with respect to two given point sets A and B, is a plane that attempts to separate RX into two halfspaces such that each open halfspace contains points mostly of A or B.

III. CHARACTERISTIC PROPERTIES OF THE TRAINING & TESTING DATA

The samples collected may be in "batches." There may not be any expected correlation between candidate ROIs in different images, but the labels of all the regions identified from the same patient's medical images are likely to be at least somewhat correlated. This is true because both metastasis is an important possibility in cancer and the patient's general health and preparation for imaging are important factors in diagnostic classification (e.g., how thoroughly was the cleaning of stool undertaken before a colonoscopy).

Additionally, if no radiologist marking is close to a candidate in the training set, the class label may be assumed to be negative (i.e., normal) with a high degree of confidence. However, if a candidate is close to a radiologist marking, although it is often positive (e.g., malignant), this may not always be the case.

Even though at least some of the candidates which are close to a radiologist marking are truly diseased, often other candidates refer to structures that happen to be nearby but are healthy. Thus, if one identifies the class label of a candidate as "unhealthy" based only on its spatial proximity to the ground-truth mark, there is a potential for some of the possible positive marks to be healthy, introducing an asymmetric labeling error in the training data. Finally, since healthy patients are much more common than unhealthy patients (in routine clinical screening environments), there is often a strong class imbalance in the testing data.

IV. STANDARD CLASSIFICATION SHORTCOMINGS

In the CAD literature, machine learning algorithms—such as neural networks, support vector machines (SVM), and Fisher's linear discriminant—have been employed to train CAD classifiers. However, almost all the standard methods for classifier design explicitly assume that the data is "IID" (independent and identically distributed). This is violated by the somewhat special characteristics of the CAD data as discussed above. Even more problematic is the fact that after the training phase is completed, and during the testing phase, conventional methods evaluate each candidate's disease status may ignore the features, locations, and labels of other neighboring candidates.

In sum, conventional algorithms assume that the training samples or instances are drawn identically and independently from an underlying—though unknown—distribution. However, due to the spatial adjacency of the regions identified by a candidate generator, the features, the locations, and the class labels of several adjacent candidates may be highly correlated. This may be true both in the training set and in the testing data. The batch-wise classification embodiments discussed herein may take these correlations, as well the differences between candidates, into account.

V. PROBABILISTIC BATCH CLASSIFICATION MODEL

Let $\bar{x}_i^j \in R^d$ represent the d features for the $i^{th}$ candidate in the $j^{th}$ image, and let $\bar{w} \in R^d$ be the parameters of some hyper-plane classifier. Traditionally, samples are classified one at a time (i.e. independently) based on:

$$z_i^j = \bar{w}'\bar{x}_i^j = (x_i^j)'w, z \in R^1 \quad (1)$$

For example, in a logistic regression, the posterior probability of the sample $\bar{x}_i^j$ belonging to class +1 is obtained using the logistic sigmoid function $$P(y_i^j = 1 \mid x_i^j) = p(\bar{w}'\bar{x}_i^j) = \frac{1}{1 + \exp(-\bar{w}'\bar{x}_i^j)}$$

By contrast, in the present probabilistic model, $z_i^j$ is viewed as only a noisy observation of the underlying, unobserved variable $u_i^j \in R^1$ that actually influences classification (as opposed to the traditional classification approach, where classification directly depends on $z_i^j$).

A-priori guess or intuition about $u_i^j$ is estimated even before any $x_i^j$ (therefore before $z_i^j$) is observed, which is purely based upon the spatial locations of candidates in the $j^{th}$ image. This spatial adjacency is what may induce the correlation in the predictions for the labels. This may be modeled as a Gaussian prior on $u_i^j$.

$$P(\bar{u}^j \in R^{n_j}) = N(\bar{u}^j \mid 0, \Sigma^j) \quad (2)$$

where $n_j$ is the number of the candidates in the $j^{th}$ image, and the covariance matrix $\Sigma^j$ (which encodes the spatial proximity based correlations) may be defined in terms of D, the matrix of Euclidean distances between candidates inside a medical image (from a patient) as $\Sigma^j = \exp(-\alpha D)$.

Having defined a prior, next the likelihood is defined as follows:

$$P(z_i^j \mid u_i^j) = N(z_i^j \mid u_i^j, \sigma^2) \quad (3)$$

After observing $x_i^j$ and therefore $z_i^j$, the prior intuition about $\bar{u}^j$ (2) may be modified based upon the observations (3) to obtain the Bayesian posterior as:

$$P(\bar{u}^j \mid \bar{z}^j) = N\left(\bar{u}^j \mid (\Sigma^{j-1}\sigma^2 + I)^{-1}\bar{z}^j; \left(\Sigma^{j-1} + \frac{1}{\sigma^2}I\right)^{-1}\right) \quad (4)$$

The class-membership prediction for the $i^{th}$ candidate in the $j^{th}$ image may be controlled exclusively by $u_i^j$. The prediction probability for class labels, $\bar{y}^j$ may then be determined as follows:

$$P(y^j = 1 \mid X^j, \bar{w}, \alpha, \sigma^2) = \rho([\Sigma^{j-1}\sigma^2 + I]^{-1}[X^j w]) \quad (5)$$

where $$\rho(r) = \frac{1}{1 + \exp(-r)}.$$

However, it should be noted that this approach to batch-wise prediction may be potentially slow (due to the matrix inversion) if the test data arrives in large batches.

VI. LEARNING IN THIS MODEL

For batch-wise prediction using (5), w, $\alpha$ and $\sigma^2$ may be learned from a set of N training images via maximum-a-posteriori (MAP) estimation as follows:

$$[\hat{w}, \hat{\alpha}, \hat{\sigma}^2] = \arg\max_{w, \alpha, \sigma^2} P(w) \prod_{j=1}^{N} P(\bar{y}^j \mid X^j, \bar{w}, \alpha, \sigma^2) \quad (6)$$

where $P(y^j \mid x^j, \bar{w}, \alpha, \sigma^2)$ is defined as in (5) and $P(w)$ may be assumed to be Gaussian $N(w \mid 0, \lambda)$.

To be noted from Equations 4 and 5 is that $[\bar{u}^j \mid \bar{z}^j] = (\Sigma^{j-1}\sigma^2 + I)^{-1/j}$. In other words, the class membership prediction for any single sample is a weighted average of the noisy prediction quantity $\bar{z}^j$ (distance to the hyper-plane), where the weighting coefficients depend upon the pair wise Euclidean distances between samples. Hence, the intuition presented above is that the classes for all the $n_j$ candidates in the $j^{th}$ image are predicted together, as a function of the features for all the candidates in the batch (here a batch corresponds to an image from a patient). In every test, each of the candidates may be classified using the features from all the samples in the image.

VII. MATHEMATICAL PROGRAMMING APPROACH

Using equations (5) and (6) as a foundation, the problem of teaming for batch-wise prediction in an SVM-like fashion may be formulated. Standard SVM formulations may include a hyper-plane classifier $f'(x) = x'w - \gamma$ that is learned from the training instances individually and ignoring the correlations among them. Consider the problem of classifying m points in the n-dimensional real space $R^n$, represented by the m×n matrix A, according to membership of each point $A_i$ in the class A+ or A− as specified by a given m×m diagonal matrix D with plus ones or minus ones along its diagonal. For this problem, the standard 1-norm support vector machine with a linear kernel may be given by the following linear program with parameter $v > 0$:

$$\begin{aligned}
&\min_{(w, \gamma, y, v) \in R^{n+1+m+n}} \\
&\quad ve'y + e'v \\
&\text{s.t. } D(Aw - e\gamma) + y \geq e \\
&\quad v \geq w \geq -v \\
&\quad y \geq 0,
\end{aligned} \quad (7)$$

where, at a solution, v is the absolute value $|w|$ of w.

Let $B^j \in R^{m_j \times n}$ represent the $m_j$ training points that belong to the $j^{th}$ batch and the labels of these training points are represented by the $m_j \times m_j$ diagonal matrix with $D^j$ positive or negative ones along its diagonal. Then, the standard SVM set of constraints $D(Aw-e\gamma)+y \geq e$ may be modified to take into account the correlations among samples in the same batches. Using the same idea presented in equation (5) in the following way:

$$D^j[(\Sigma^{j-1}\sigma^2+I)^{-1}(B^jw-e\gamma)]+y^j \geq e, \text{ for } j=1,\ldots,k \quad (8)$$

Note that for each batch j, in a naive implementation, the probabilistic method requires calculating two matrix inversions, first to calculate $\Sigma^{-1}$ and then to calculate $(\Sigma^{-1}\sigma^2+I)^{-1}$ for every single batch as presented in Equation (5). Hence, training and testing using this method may be time consuming for every single batch size. In order to avoid this problem, equation (8) may be modified by replacing the expression $(\Sigma^{-1}\sigma^2+I)^{-1}$ by a much simpler expression: $(\Sigma\sigma^2+I)$. Then the correlation among samples belonging to the same batch may be modeled by replacing the standard SVM set of constraints by:

$$D^j[(\theta\Sigma^j+I)(B^jw-e\gamma)]+y^j \geq e, \text{ for } j=1,\ldots,k \quad (9)$$

where $\theta=\sigma^2$. Note that as in equation (8), the class membership prediction for any single sample in batch j is a weighted average of the batch members prediction vector $B^jw$, and again the weighting coefficients depend upon the pair wise Euclidean distances between neighboring samples.

By replacing equation (9) in formulation (7), the "BatchSVM" formulation with parameters $v$ and $\theta$ may be developed as:

$$\min_{(w,\gamma,y,v) \in R^{n+1+m+n}} \quad (10)$$

$$ve'y + e'v$$

$$s.t. \; D^j[(\theta\Sigma+1)(B^jw-e\gamma)] + y^j \geq e, \text{ for } j=1,\ldots,k$$

$$v \geq w \geq -v$$

$$y \geq 0,$$

Where $y=(y^1,\ldots,y^k)$.

In order to illustrate the batch learning method, an example is depicted in FIG. 2. FIG. 2a displays batches of training points in a two dimensional feature space. The batch may be selected manually or automatically by a software program. The data points that belong to the same batch are indicated by the elliptical boundaries in FIG. 2a. The data points, or candidate samples, numbered 1 through 5 belong to Batch 1 and the data points numbered 6 through 10 belong to Batch 2. As shown, candidates 1, 2, 4, 6, and 8 are represented by circles and are positive data points. On the other hand, candidates 3, 5, 7, 9 and 10 are represented by stars and are negative data points.

Figure 2A:
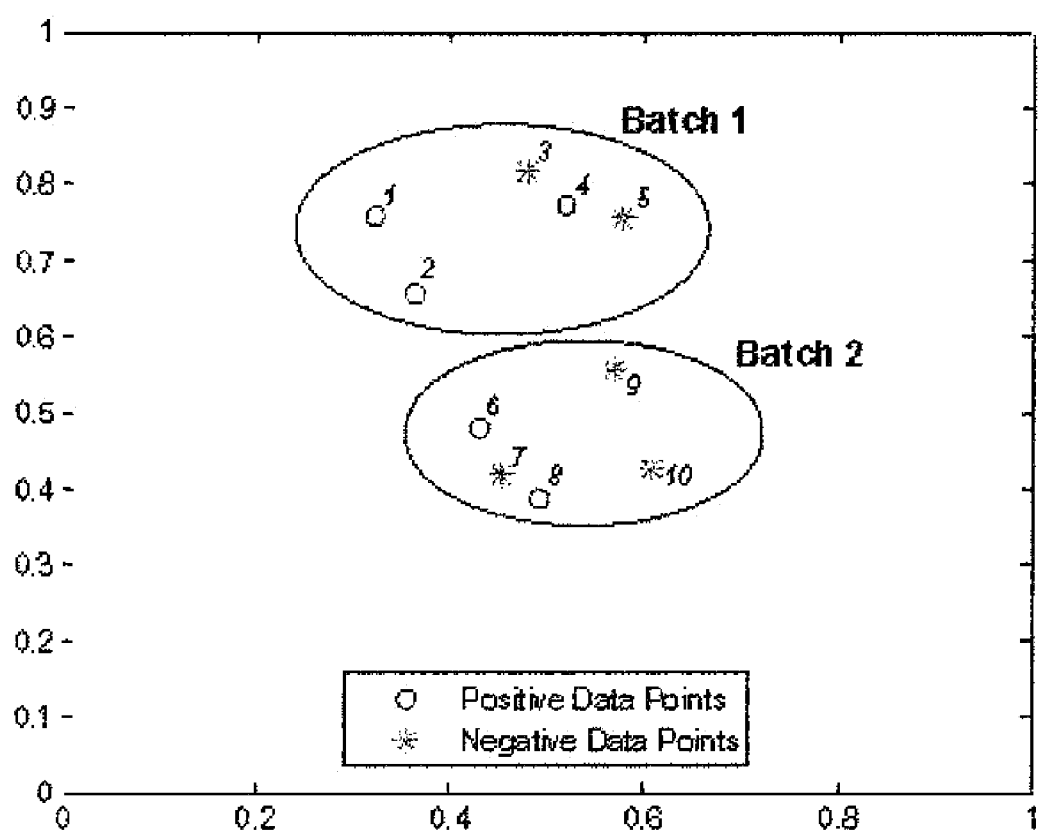
FIGS. 2a-d illustrate exemplary batch learning.
Figure 2B:
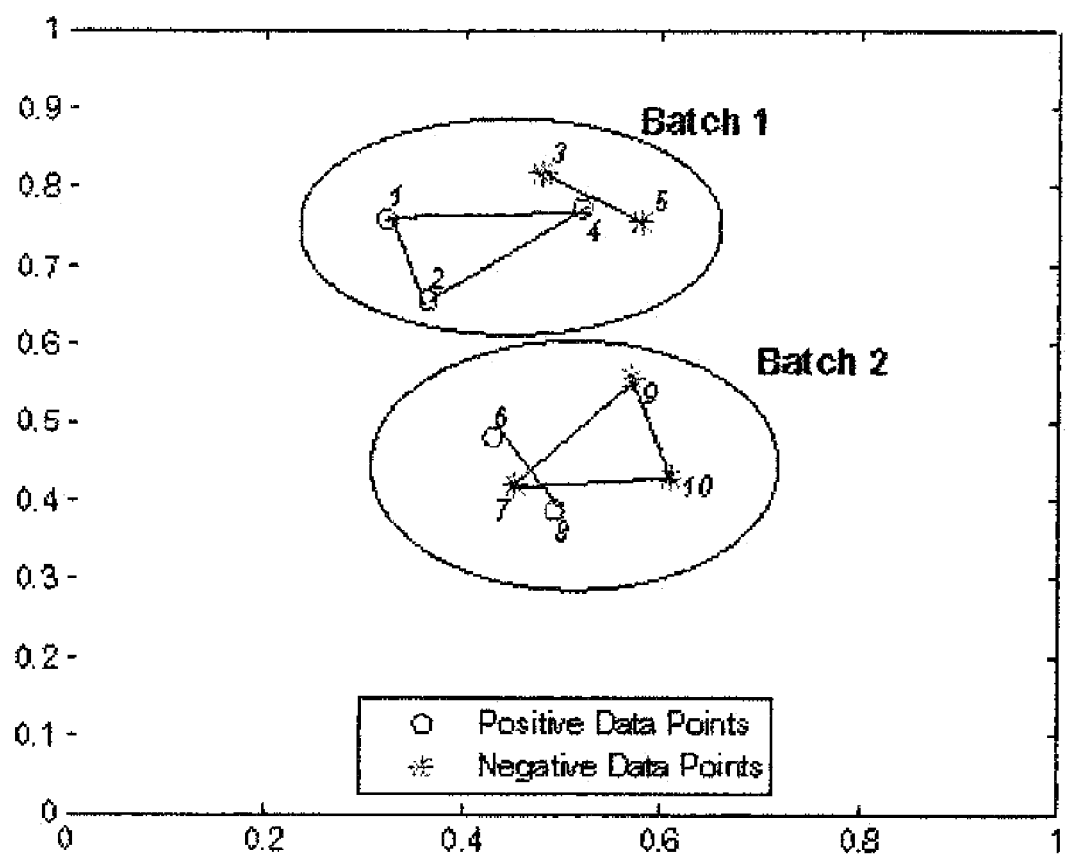

FIG. 2b displays the correlations among the training points given in FIG. 2a. In the Figures, correlated points are linked to each other, whereas uncorrelated points are not. As shown, in Batch 1 like positive data points 1, 2, and 4 and like negative data points 3 and 5 are linked. In Batch 2, like positive data points 6 and 8 and like negative data points 7, 9, and 10 are linked. The data points may be linked in a number of manners, such as by determining the features of each candidate and accounting for the correlations or similar characteristics of the candidates.

Unlike standard SVMs, the hyper-plane ($f(x)=w'x-b$) produced by BatchSVM is not considered as the decision function. Therefore, $f(x)$ is referred to as a pre-classifier that will be used in the next stage to make the final decision on a new batch of instances. While testing an arbitrary datapoint $x_i^j$ in batch $B^j$, the BatchSVM formulation takes into account every other batch member prediction $w'x_p^j$ to obtain the sign and to the final prediction value of $\hat{f}(x_i^j)$ as follows:

$$\hat{f}(x_i^j)=w'x_i^j+\theta\Sigma^jB^jw \quad (11)$$

Figure 2C:
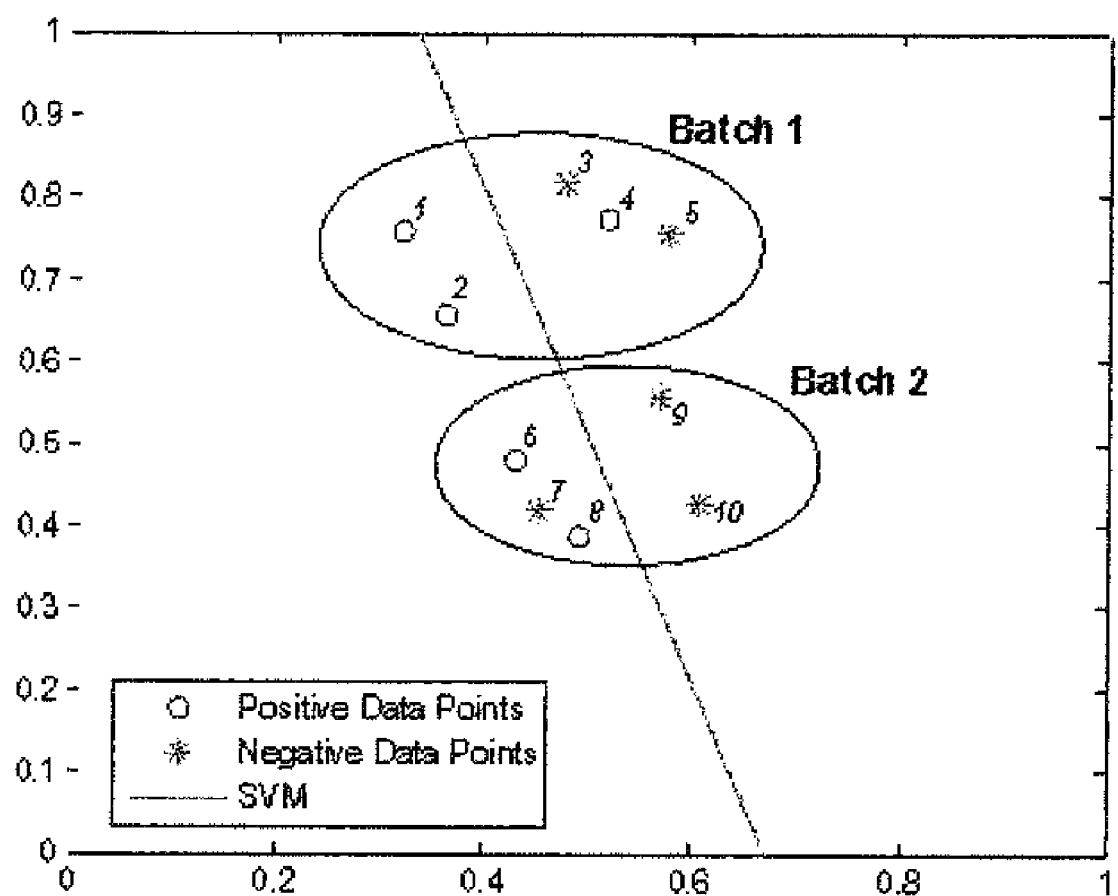
Figure 2D:
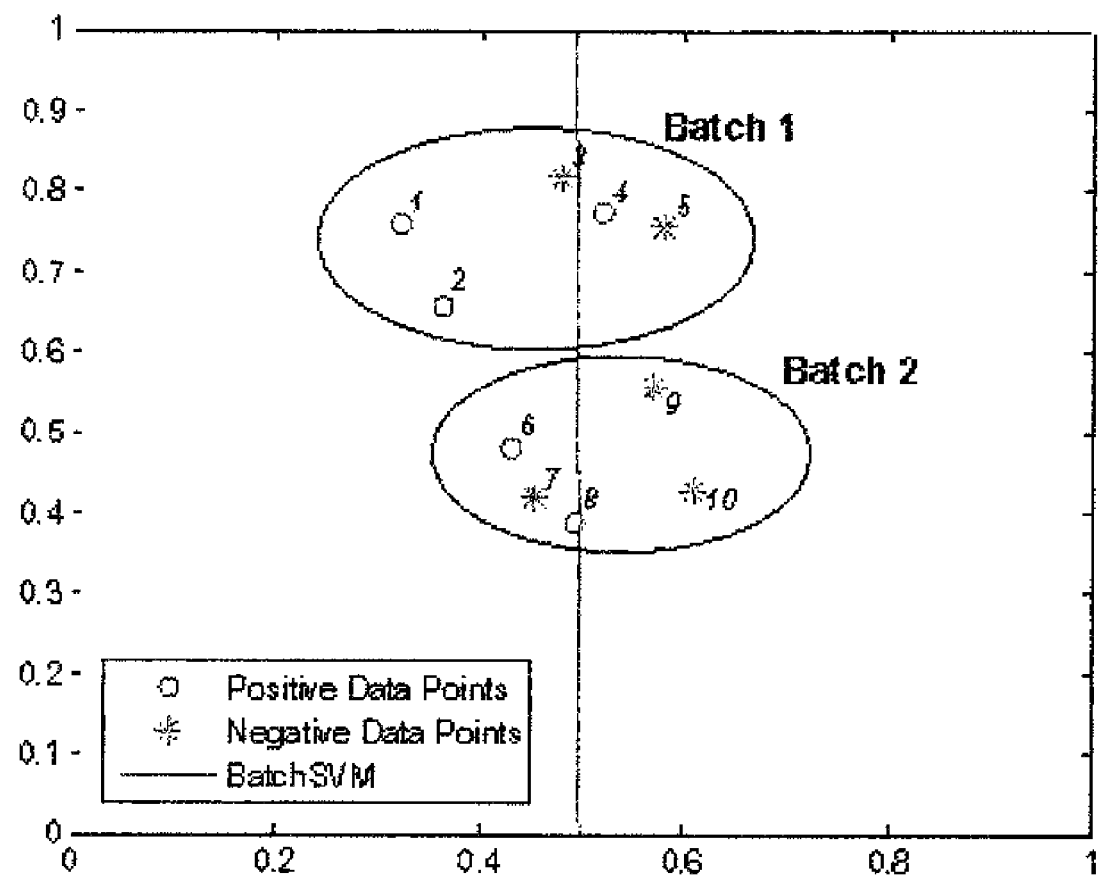

The hyper-planes obtained by SVM and BatchSVM are illustrated in FIGS. 2c and 2d respectively. The hyper-plane obtained by SVM, $f_{SVM}(x)$ is the final decision function for SVM and gives the results displayed in Table I, where the fourth and the seventh instances (as shown by the fourth and seventh rows, respectively) are misclassified. The pre-classifier produced by BatchSVM, $f_{batch}(x)$ gives the results displayed in the second column of Table I for the training data. If this pre-classifier were to be considered as the decision function, then the third, fourth and seventh training points would be misclassified. However, when we apply batch testing (11), the prediction of those points are corrected as displayed in the third column of Table I.

Table I below lists the outputs of the classifier produced by SVM, and the pre-classifier and the final classifier produced by BatchSVM. The outputs are calculated for the data points presented in FIGS. 2a-2d. The first column of Table I indicates the order of the data points as they are depicted in FIGS. 2a-2d and the second column specifies the corresponding labels, such as positive or negative. Misclassified points are displayed in bold, such as the SVM points in rows 4 and 7, as well as the pre-classifier points in rows 3, 4, and 7. Note that the outputs of the pre-classifier (fourth column) are corrected by the final classifier that predicated all of the points correctly (fifth column).

TABLE I

Summary of Results

| | Label | SVM | Pre-classifier | Final classifier |
|---|---|---|---|---|
| 1 | + | 0.2826 | 0.1723 | 0.1918 |
| 2 | + | 0.2621 | 0.1315 | 0.2122 |
| 3 | − | −0.2398 | 0.0153 | −0.0781 |
| 4 | + | −0.3188 | −0.0259 | 0.2909 |
| 5 | − | −0.4787 | −0.0857 | −0.0276 |
| 6 | + | 0.2397 | 0.0659 | 0.0372 |
| 7 | − | 0.2329 | 0.0432 | 0.0888 |
| 8 | + | 0.1490 | 0.0042 | 0.0680 |
| 9 | − | −0.2525 | −0.0752 | −0.1079 |
| 10 | − | −0.2399 | −0.1135 | −0.1671 |

Similar to a proximal support vector machines formulation (PSVM), the set of inequalities (9) may be slightly modified and a Gaussian prior considered (instead of a Laplacian) for both the error vector y and the regularization term to obtain the following unconstrained formulation:

$$\min_{(w,\gamma,\theta) \in R^{n-1+m}} v\frac{1}{2} \quad (12)$$

$$\sum_{j=1}^{k} \left\| D^j[(\theta\Sigma^j+I)(B^jw-e\gamma)] \right\|^2 + \frac{1}{2}(w'w+\gamma^2)$$

Note that formulation (12) is a strongly convex (quadratic) unconstrained optimization problem and has a unique solution. Obtaining the solution to formulation (12) may require only solving a single system of linear equations. Therefore, using formulation (12) may be substantially faster than the linear programming approach, while maintaining approximate accurate results. Moreover, this simple formulation permits a very small modification to learn the parameter θ in a very simple but effective manner:

$$\min_{(w, \gamma, \theta) \in R^{n-1+m}} \nu \frac{1}{2} \sum_{j=1}^{k} \left\| D^j[(\theta \Sigma^j + I)(B^j w - e\gamma)] \right\|^2 + \frac{1}{2}(w'w + \gamma^2 + \theta^2) \quad (13)$$

This formulation may be strongly convex in all its variables (w, γ, θ) and have a unique solution as well. The optimization problem (13) may be solved in many different ways.

Alternatively, the optimization approach identified below may suit the structure of the problem and converge rapidly to a solution. During experiments, it took nine iterations on average for the algorithm to converge during experiments. The alternate optimization method used may be summarized as follows:

0. initialization: Given an initial $\theta_0$, the parameter ν, the training data $A=\cup_{j=1}^{k} B^j$ and the corresponding labels D.
1. Solve optimization problem (12) for $\theta=\theta^{i-1}$ and obtain $w^i$ and $\gamma^i$.
2. For the obtained $w^i$ and $\gamma^i$, solve the following linear system of equations:

$$\theta^i = \frac{-\sum_{j=1}^{k} M^j}{2 \sum_{j=1}^{k} N^j} \quad (14)$$

where $$M^j = \left[ w'B^{j'} Z_j B^{j'} Z_j e\gamma - \gamma e' Z_j B^j w + \gamma e' Z_j e\gamma - 2e' D^j \Sigma^j e\gamma \right] \quad (15)$$

$$N^j = \left[ w'B^{j'} E^{j'} \Sigma^j B^j w - w'B^{j'} \Sigma^{j'} e\gamma - \gamma e' \Sigma^{j'} \Sigma^j B^j w + \gamma e' \Sigma^{j'} \Sigma^j e\gamma + \frac{1}{\mu} \right] \quad (16)$$

Here $Z_j$ is defined as $(\Sigma^{j'}+\Sigma^j)$ in order to simplify the notations.

In other words, the above iterative method has two steps. At the first step, the method determines the optimum values of w and γ ($w_{opt}, \gamma_{opt}$) for a given θ. At die second step, for the given $w_{opt}$ and $\gamma_{opt}$, the method determines the optimum value of θ ($\theta_{opt}$) which may be used at the first leg of the next iteration. Initially, a random value for θ may be assigned and the procedure may be repeated until it converges to the global optimum solution for w, γ and θ.

VIII. EXPERIMENTS

The Similarity Function

As mentioned earlier, the matrix $\Sigma^j$ represents the level of correlation between all pairs of candidates from a batch (an image in one aspect) and it is a function of the pair wise similarity between candidates. In CAD applications, the covariance matrix $\Sigma^j$ may be defined in terms of the matrix of Euclidean distances between candidates inside a medical image. Let $z_p$ and $z_q$ represent the coordinates of two candidates, $B_p^j$ and $B_q^j$ on the $j^{th}$ image. For the experiments, $z_p$ and $z_q$ defined the pair wise similarity, s(p,q), between $B_p^j$ and $B_q^j$ as follows:

$$s(p, q) = e - \frac{\|I_p - 2q\|^2}{c^2} \quad (17)$$

Then, the continuous similarity function, s(p,q), is converted to the binary similarity function, s*(p,q) by applying a threshold in the following way:

$$s*(p, q) = \begin{cases} 0, s(p, q) < e^{-4} \\ 1, s(p, q) \geq e^{-4} \end{cases} \quad (18)$$

The threshold is set at $e^{-4}$ to provide a similarity of one if the neighbor is at a 95% confidence level of belonging to the same density as the candidate, assuming that the neighborhood is a Gaussian distribution with the mean equal to candidate and variance $s^2$. Then, each component pq of the matrix Σ is given by:

$$\Sigma_{pq}=s*(p,q) \quad (19)$$

IX. COMPARISONS

In this section, three techniques are compared: regular SVM, probabilistic batch learning (BatchSVM$_1$), and BatchSVM (BatchSVM$_2$). PSVM based techniques introduced herein are also compared: 1) a proximal version of batch learning presented in (12) where θ is tuned as a parameter, (Pbatch), and 2) an alternating optimization method presented in (13), where θ is learned automatically (Abatch). These techniques are compared on three CAD applications: pulmonary embolism, colon cancer, and lung cancer detection. All parameters in these experiments are tuned by 10-fold Patient Cross Validation on the training data (i.e., the training data is split into ten folds, each fold with ten different patients). All algorithms are trained on the training data and then tested on the sequestered test data. The resulting Receiver Operating Characteristics (ROC) plots are obtained by trying different values of the parameters (θ, σ) for BatchSVM, where θ took values from −1, −0.9, ..., 0.9, 1 and σ ranged from $10^{-3}$ through $10^1$.

X. EXAMPLE

Pulmonary Embolism

Data Sources and Domain Description. Pulmonary embolism (PE), a potentially life-threatening condition, is a result of underlying venous thromboembolic disease. An early and accurate diagnosis is the key to survival. Computed tomography angiography (CTA) has emerged as an accurate diagnostic tool for pulmonary embolism. However, there are hundreds of CT slices in each CTA study. Manual reading is laborious, time consuming, and complicated by various pulmonary embolism look-alikes (false positives) including respiratory motion artifact, flow-related artifact, streak artifact, partial volume artifact, stair step artifact, lymph nodes, vascular bifurcation, and many others.

An emboli forms with complex shape characteristics in the lung making the automated detection very challenging. The candidate generation algorithm searches for intensity minima. Since each emboli is usually broken into several smaller units, candidate generation picks up several points of interest in the close neighborhood of an emboli from which features are extracted. Thus, it may usually require quite a few instances (feature vectors) to sufficiently characterize an emboli in the feature space. A traditional instance-based learning algorithm assumes that all samples are independently distributed in the feature space. However, it is clear that this assumption may be violated here because regions associated with the same emboli are not independent. Therefore, an instance-based learning algorithm may not be an effective way to tackle this problem.

72 cases were collected with 242 pulmonary embolisms marked by expert chest radiologists at four different institutions (two North American sites and two European sites). The cases were randomly divided into two sets: training (48 cases with 173 clots) and testing (24 cases with 69 clots). The test group was sequestered and only used to evaluate the performance of the final system.

The training data patient and pulmonary embolism information included 48 cases in the training set. A total of 173 pulmonary embolisms were identified in the training set with a total number of 3655 candidates.

The testing data patient and pulmonary embolism information included 24 cases in the testing set. A total of 69 pulmonary embolisms were identified in the testing set with a total number of 1857 candidates. A combined total of 70 features were extracted for each candidate.

Figure 3A:
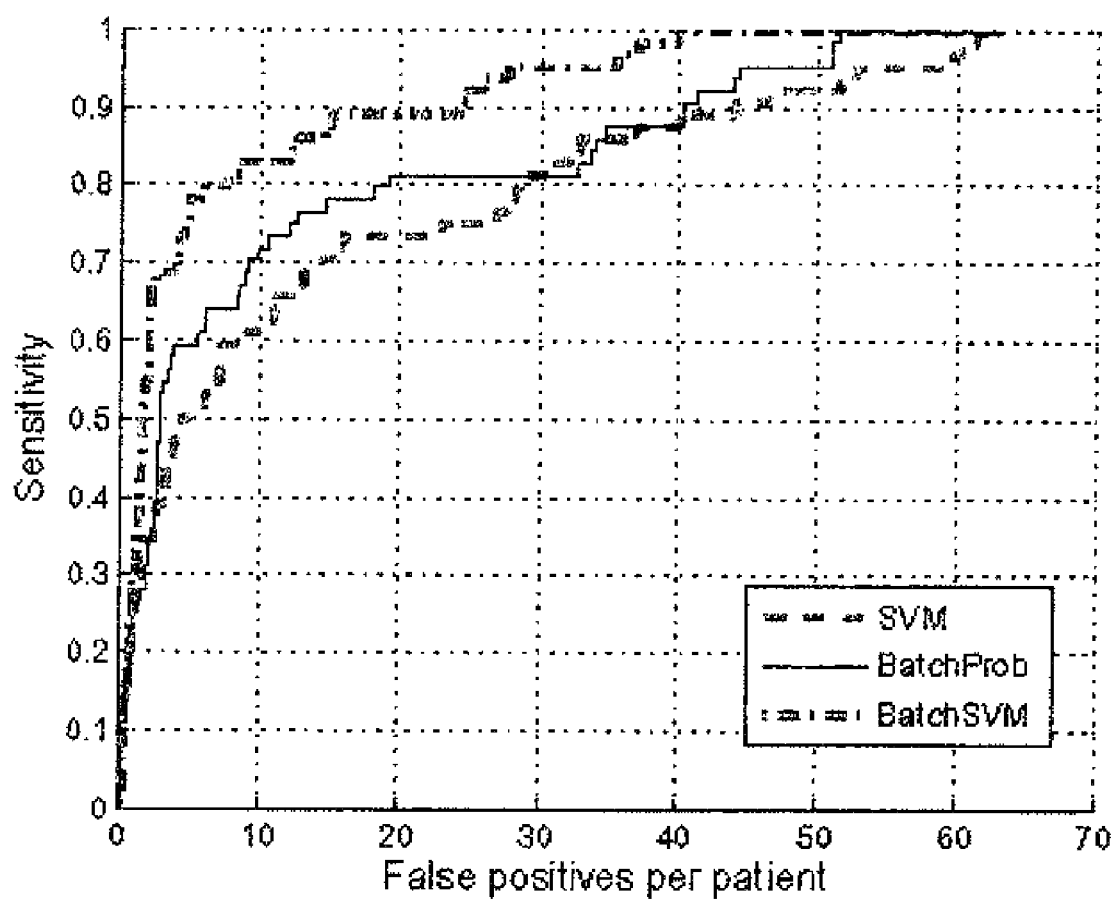
FIGS. 3a and 3b illustrate exemplary results for pulmonary embolism candidates.
Figure 3B:
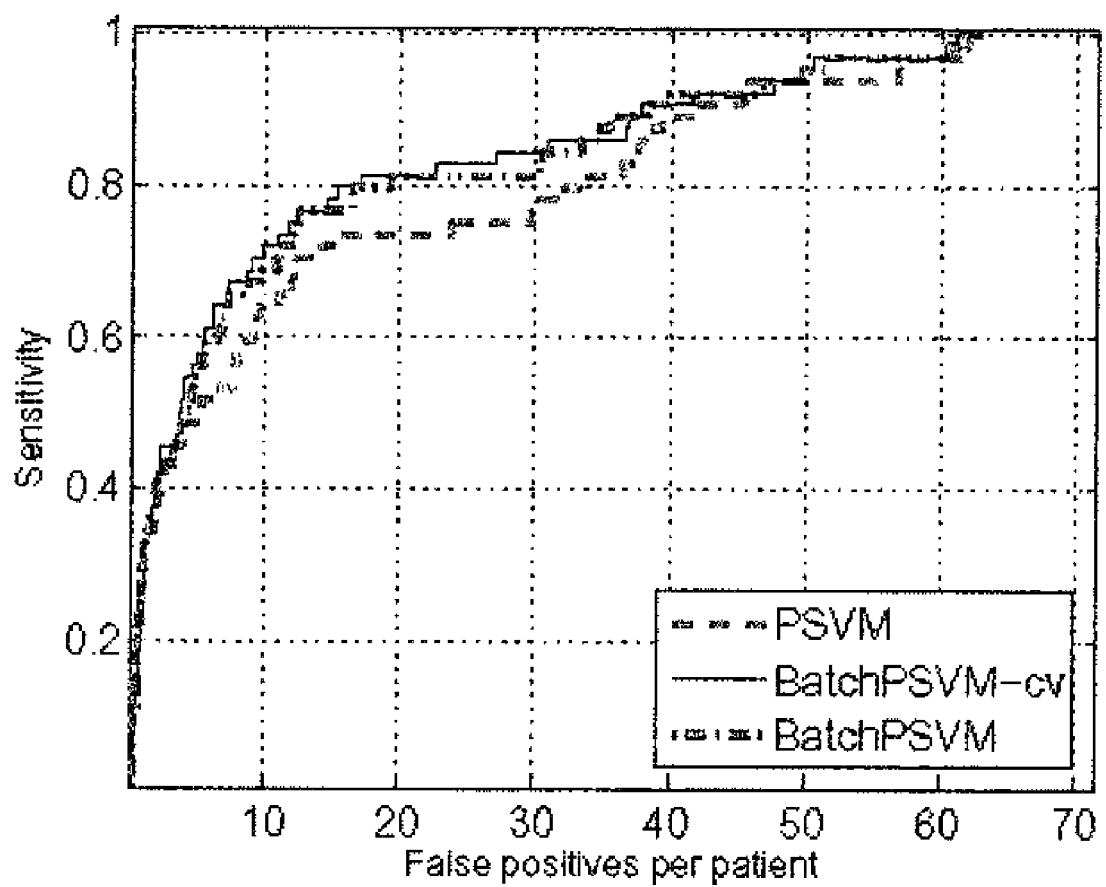

The results for batch classification performed on pulmonary embolism candidates are shown in FIGS. 3a and 3b. FIGS. 3a and 3b display the ROC plots of the pulmonary embolism data. FIG. 3a demonstrates that BatchSVM$_1$, (shown as BatchProb in FIG. 3a) performs significantly better than standard SVM. On the other hand, the BatchSVM$_2$ formulation results in an improvement as seen in FIG. 3a where there is a remarkable difference between SVM and BatchSVM$_2$ (shown as BatchSVM in FIG. 3a).

When the performances of PSVM, Pbatch and Abatch are compared in FIG. 3b, it is demonstrated that the proposed methods (Pbatch and Abatch) dominate over PSVM. However, Pbatch and Abatch (shown as the BatchPSVM curves in FIG. 3b) do not improve the accuracy of PSVM as much as BatchSVM$_1$ and BatchSVM$_2$ do. Note that Pbatch and Abatch produced comparable ROC plots.

XI. EXAMPLE

Colon Cancer Detection

Data Sources and Domain Description. Colorectal cancer is the most common cancer in both men and women. It has been estimated that nearly 147,000 cases of colon and rectal cancer will be annually diagnosed in the U.S., and more than 56,700 people will die from colon cancer within a year's time. In over 90% of the previous cases, colon cancer progressed rapidly from local (polyp adenomas) to advanced stages (colorectal cancer), which has very poor survival rates. However, identifying (and removing) lesions (polyp) when still in a local stage of the disease, has very high survival rates, thus illustrating the critical need for early diagnosis.

The sizes of a polyp in the colon can vary from 1 mm all the way up to 10 cm. Most polyps, no matter how small, are represented by two candidates—one obtained from the prone view and the other from the supine view. Moreover, for large polyps or so-called "masses" a typical candidate generation algorithm generates several candidates across the polyp surface. Therefore, most polyps in the training data are inherently represented by multiple candidates. For the sake of clinical acceptability, it is sufficient to detect one of the candidates during classification. Unlike a standard classification algorithm, where the emphasis is to accurately classify each and every candidate, here it may be sought to classify at least one of the candidates representing a polyp accurately.

The database of high resolution CT images used in this study was obtained from seven different sites across the U.S., Europe, and Asia. The 188 patients were randomly partitioned into two groups: training (n=65) and test (n=123). The test group was sequestered and only used to evaluate the performance of the final system.

The training data patient and polyp information included 65 patients with 127 volumes. A total of 50 polyps were identified in the training set with a total number of 6748 candidates.

The testing data patient and polyp information included 123 patients with 237 volumes. A total of 103 polyps were identified in the testing set with a total number of 12984 candidates. A total of 75 features were extracted for each candidate.

Figure 4A:
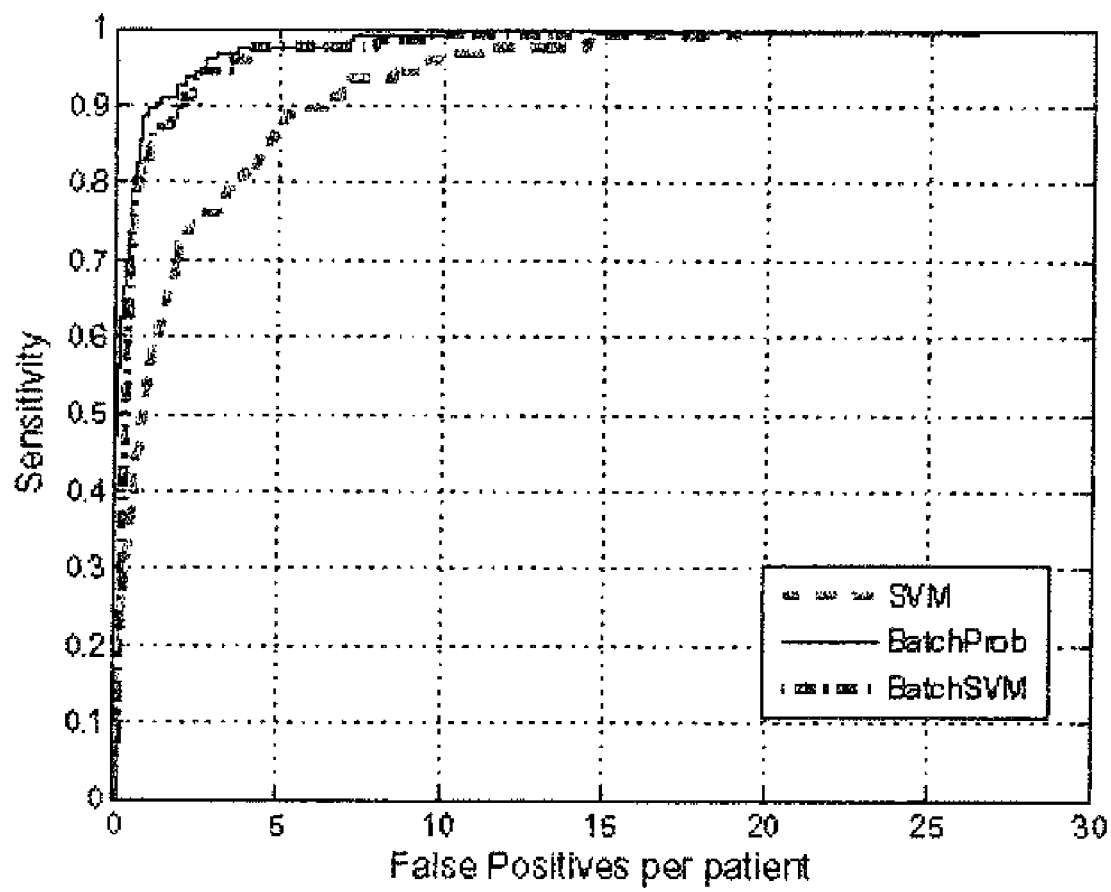
FIGS. 4a and 4b illustrate exemplary results for colon cancer candidates.
Figure 4B:
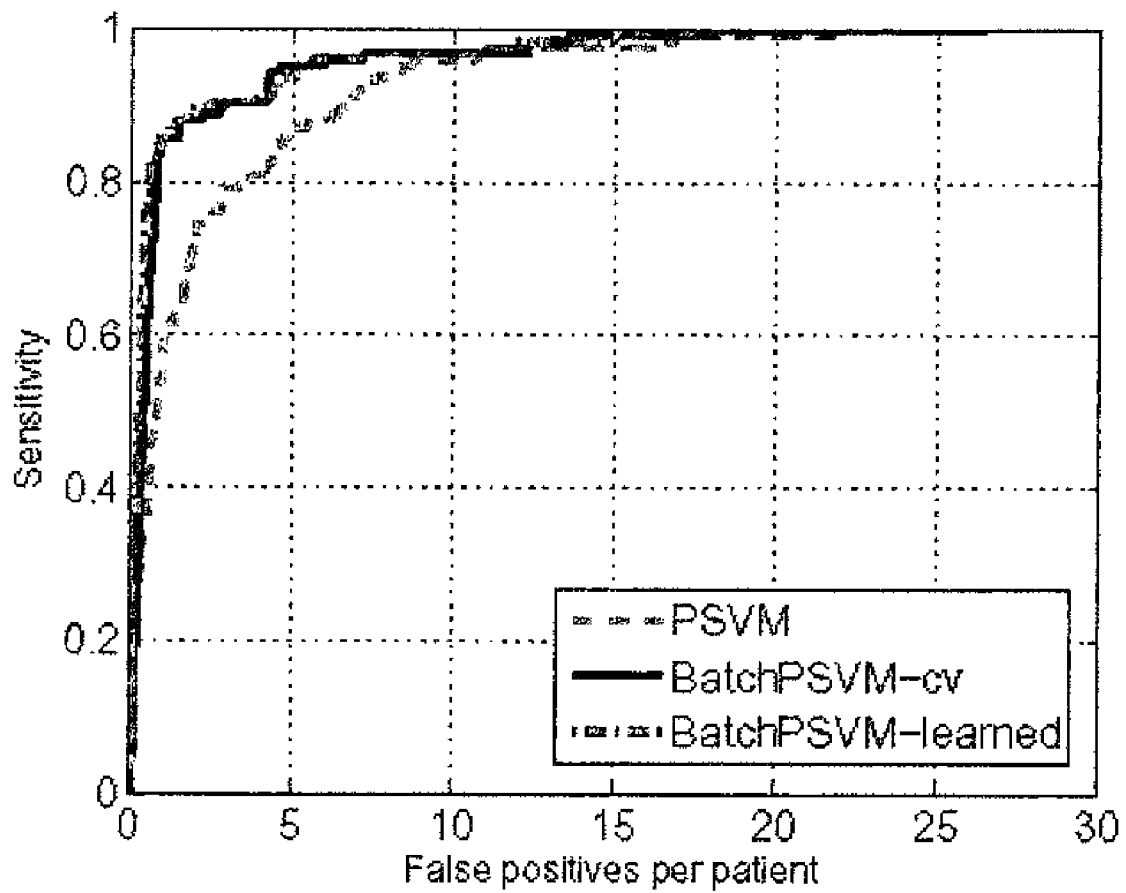

The results of batch classification of colon cancer candidates are shown in FIGS. 4a and 4b. FIGS. 4a and 4b show that the methods described herein, BatchSVM$_1$, BatchSVM$_2$, Pbatch and Abatch, are substantially better than SVM and PSVM. However, BatchSVM$_1$ (shown as BatchProb in FIG. 4a) yielded the most accurate results among the other five methods. Note that BatchSVM$_1$ and BatchSVM$_2$ (shown as BatchSVM in FIG. 4a) performed slightly better than Pbatch and Abatch (shown as the BatchPSVM curves in FIG. 4b) for this data set as well.

XII. EXAMPLE

Lung Cancer

Data Sources and Domain Description. LungCAD is a computer aided detection system for detecting potentially cancerous pulmonary nodules from thin slice multi-detector computed tomography (CT) scans. The final output of LungCAD is provided by a classifier that classifies a set of dictates as positive or negative. High sensitivity is critical as early detection of lung cancer greatly improves the chances of successful treatment. Furthermore, high specificity is also critical as a large number of false positives will vastly increase physician load and ultimately lead to loss of physician confidence. This is a very difficult classification problem: most patient lung CTs contain a few thousand structures (candidates), and only a few ($\leq$5 on average) of which are potential nodules that should be identified as positive by LungCAD, all within the run-time requirements of completing the classification on-line during the time the physician completes his or her manual review.

The training data patient information included a training set of 60 patients with 9987 candidates. 15 features were extracted for the candidates.
The testing data patient information included 26 patients in the testing set, and 6159 candidates were generated in total.

Figure 5A:
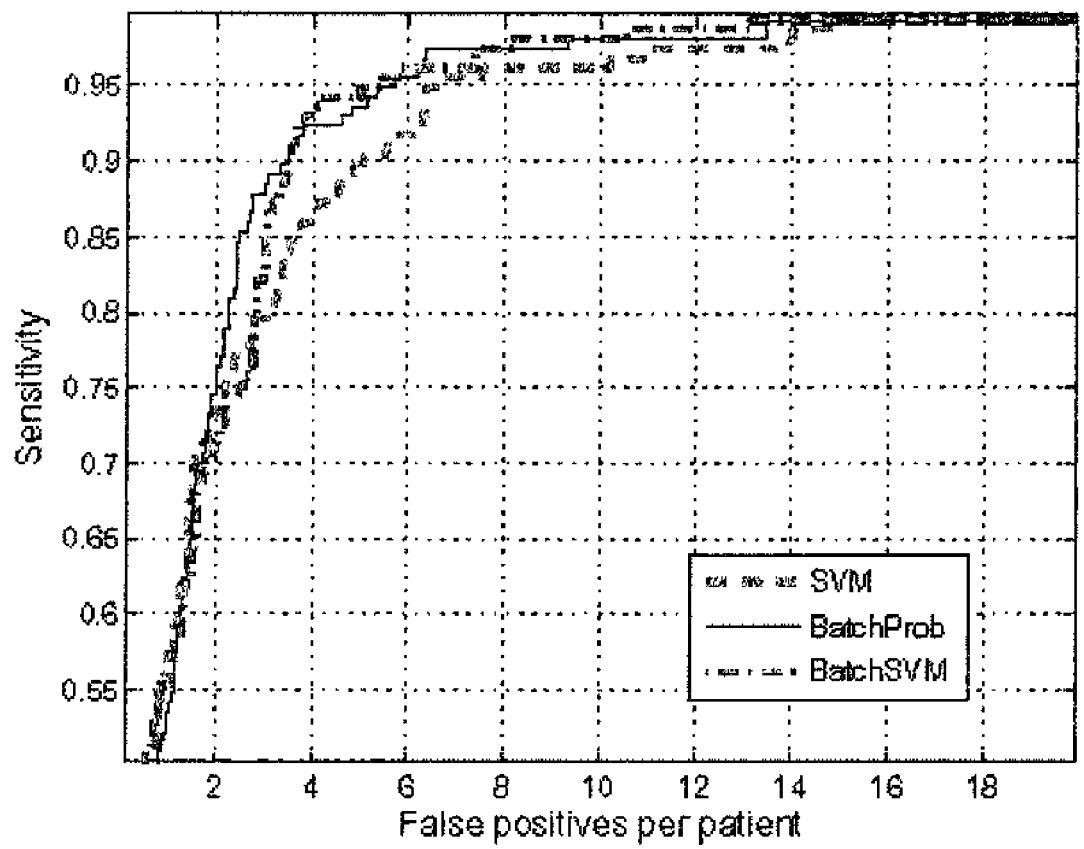
FIGS. 5a and 5b illustrate exemplary results for lung cancer candidates.
Figure 5B:
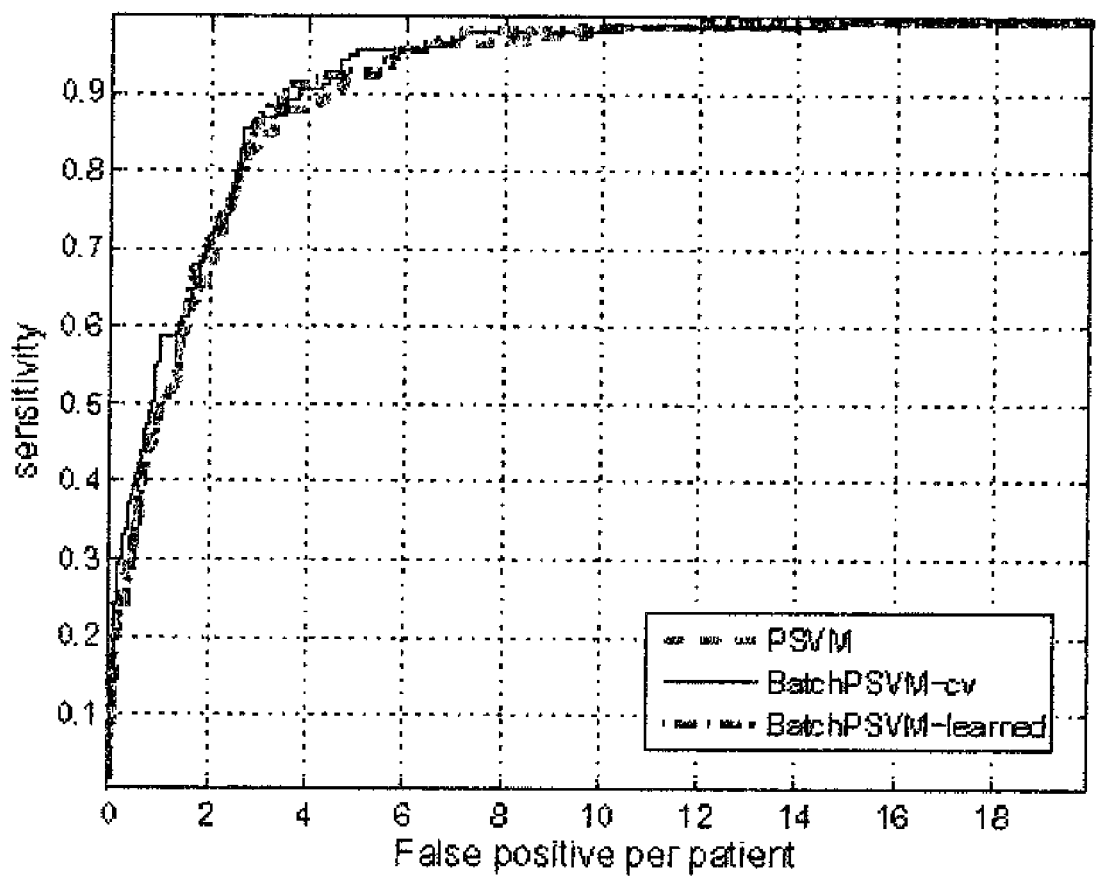

The results of the batch classification of the lung cancer candidates are shown in FIGS. 5a and 5b. As shown, for the lung cancer data, although SVM performed well, BatchSVM$_1$ (shown as the BatchProb curve) and BatchSVM$_2$ (shown as the BatchSVM curve) could still significantly improve the performance of SVM further, as illustrated in FIG. 5a. On the other hand, FIG. 5b shows that the Pbatch and Abatch (shown as the BatchPVSM curves) methods did not achieve significant improvements, yet they remain better than PSVM.

In sum, the batch classification methods utilize the correlations among the data points that are associated with subgroups of items. In one aspect, a mathematical programming algorithm (Pbatch) is employed that requires only solving a set of linear equations. Another embodiment may be an alternating optimization technique (Abatch) which not only results in a set of linear equations, but furthermore finds the optimum value of the parameter θ introduced in equation (9)

automatically. Experiments on three medical applications (candidates related to pulmonary embolisms, colon cancer, and lung cancer) demonstrate that the proposed methods outperform standard SVMs in every case.

Each of the candidates may be classified based upon internal correlations among a batch of candidates. One or more features of a number of candidates may be computed. The method may account for one or more similar features among the candidates while classifying the entire batch. For instance, the features of a diagnosed candidate may be accounted for while the remaining candidates within a batch are classified. As shown in Table 1, a composite number for each candidate may be computed that accounts for all of the descriptive features measured. The composite number of one or all of the candidates may be accounted for in classifying each of the remaining candidates within the batch. Alternatively, the only a single feature for the candidates may be computed. Other computations related to candidate features and classifications may be used.

XIII. EXEMPLARY DATA PROCESSOR

The batch classification method may be facilitated by a data processing system. The system may classify a candidate of interest within a medical image. The system include a processor and/or computer readable instructions operable to determine correlations and/or differences between (1) locations of a subset of candidates within an image, the subset either excluding or including the candidate of interest being classified, and/or (2) descriptive features associated with the subset of candidates. The processor and/or instructions may be operable to determine a location and/or at least one descriptive feature of the candidate of interest. Subsequently, the processor and/or instructions may classify the candidate of interest using the correlations and/or differences determined in steps (1) and/or (2) above along with the location and/or the at least one descriptive feature of the candidate of interest determined.

Figure 6:
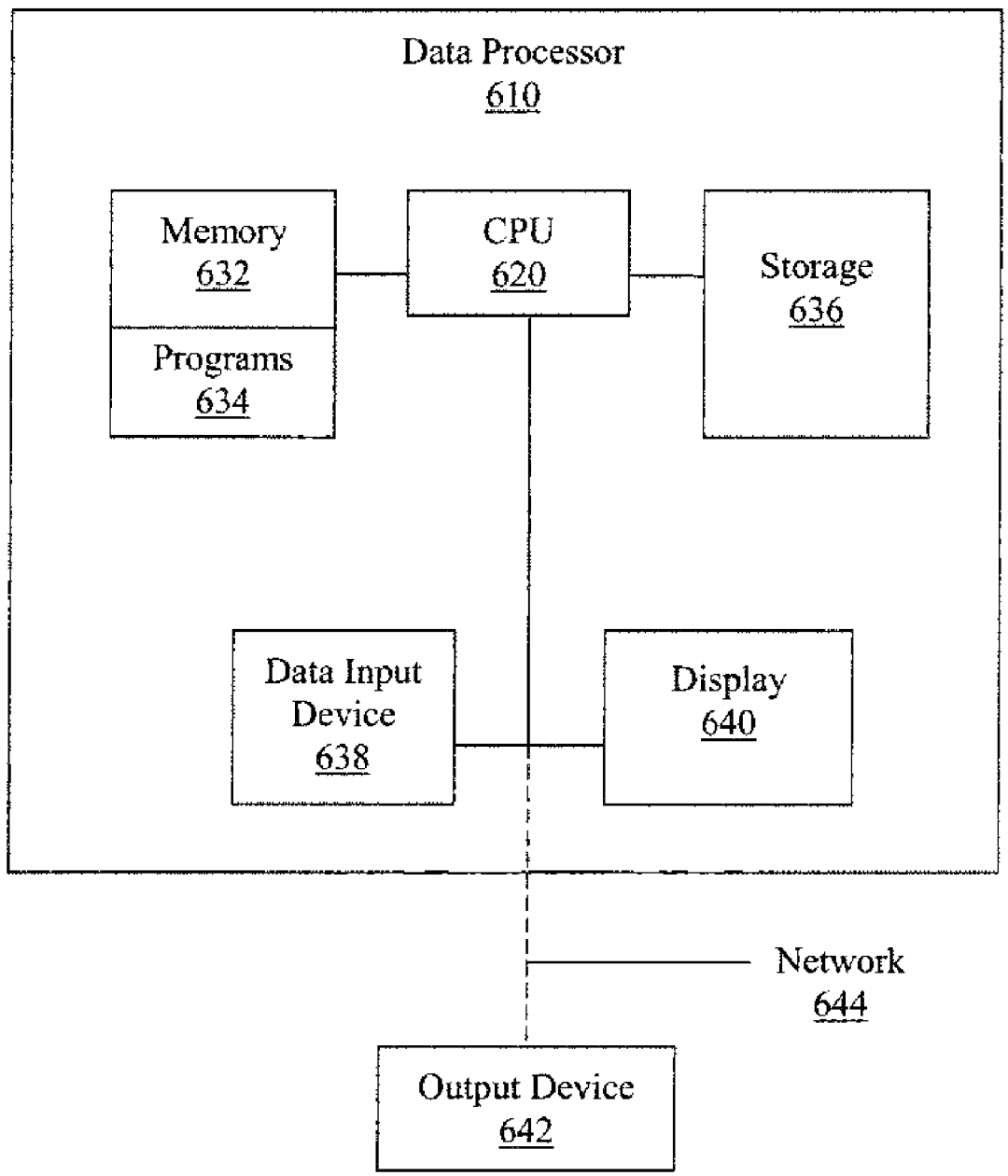
FIG. 6 is an exemplary data processing system operable to perform batch classification based upon internal correlations among the candidates being classified.

FIG. 6 is a block diagram of an exemplary data processor 610 configured or adapted to provide functionality for batch classification of candidates. The data processor 610 may include a central processing unit (CPU) 620, a memory 632, a storage device 636, a data input device 638, and a display 640. The data processor 610 also may have an external output device 642, which may be a display, a monitor, a printer or a communications port. The data processor 610 may be a personal computer, work station, server, medical imaging system, medical scanning system, or other system. The data processor 610 may be interconnected to a network 644, such as an intranet, the Internet, or an intranet connected to the Internet. The data processor 610 may be interconnected to another location via the network 644 either by data lines or by wireless communication. The data processor 610 is provided for descriptive purposes and is not intended to limit the scope of the present system. The data processor may have additional, fewer, or alternate components.

A program 634 may reside on the memory 632 and include one or more sequences of executable code or coded instructions that are executed by the CPU 620. The program 634 may be loaded into the memory 632 from the storage device 636 or network or removable media. The CPU 620 may execute one or more sequences of instructions of the program 634 to process data. The program 634 may provide functionality as discussed herein.

The image data may be entered via the data input device 638 or another input device, or received via the network 644 or other network. The data processor 610 may receive and store the medical data received in the memory 632, the storage device 636, or other storage unit. The program 634 may direct that the data received be stored on or read from machine-readable medium, including secondary storage devices such as hard disks, floppy disks, CD-ROMS, and DVDs; electromagnetic signals; or other forms of machine readable medium, either currently known or later developed.

The program 634 may instruct the data processor 610 to render internal medical images in one or more windows on the display 640, the external output device 642, or other display screen. The types of rendering may include surface rendering, ray casting, minimum or maximum intensity projections or other renderings. The data processor 610 may retrieve the images from machine-readable medium, including secondary storage devices such as hard disks, floppy disks, CD-ROMS, and DVDs; electromagnetic signals; or other forms of machine readable medium, either currently known or later developed.

The program 634 may direct the data processor 610 to perform batch classification using a probabilistic model, a mathematical programming approach, or other algorithm. The program 634 may be associated with the CAD applications discussed herein or other applications.

The data processor 610 nay divide the display 640, output device 642, or other display screen into multiple virtual sub-regions. Each sub-region may be associated with rotating, translating, panning, or zooming the images displayed. Other navigation functions may be provided.

The data processor 610 may superimpose one or more icons over the images displayed on the display 640, output device 642, or other display screen. For instance, icons, such as circular or square outlines, may be superimposed upon candidates of interests to emphasis them on the display. A user interface may accept one or more operations performed on an icon. The operation performed on the icon may move the icon with respect to the image and/or another icon. For instance, the orientation and/or size of the icon may be adjusted. Other operations may be performed.

The data processor 610 may generate a user interface that displays corresponding images in one or more windows. The corresponding images displayed in two or more different windows may have corresponding icons. The corresponding icons may relate to the same location within an image, such as a candidate of interest.

A plurality of medical image data sets may be accessed by the data processor 610. The images may include computed tomography (CT), magnetic resonance, x-ray, ultrasound, PET (positron emission tomography), and/or other medical images, such as those discussed elsewhere herein.

The data processor 610 may analyze the images generated from the data sets. The data processor 610 may search for lesions, tumors, and/or other medical anomalies within the two or three dimensional images contained in the data sets. If a suspicious structure is located, a subset of the data associated with a corresponding anatomical region or a particular organ may be used during further processing and for generating the ensuing display(s).

While the invention has been described above by reference to various embodiments, it should be understood that many changes and modifications can be made without departing from the scope of the invention. The description and illustrations are by way of example only. Many more embodiments and implementations are possible within the scope of this invention and will be apparent to those of ordinary skill in the art. The various embodiments are not limited to the described environments and have a wide variety of applications.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

We claim:

1. A method of classifying a candidate of interest within a medical image, the method comprising:
   (1) determining correlations and differences between locations of a subset of one or more candidates within an image, the subset either excluding or including the candidate of interest being classified;
   (2) determining correlations and differences between descriptive features of the subset of one or more candidates; and
   (3) classifying the candidate of interest using the correlations and differences determined in (1) and (2) along with a location and one or more descriptive features of the candidate of interest.

2. The method of claim 1, wherein the candidate of interest comprises a suspicious item or a region of interest within the image.

3. The method of claim 1, wherein a descriptive feature is based upon a quantitative measurement associated with a corresponding candidate as shown in the image.

4. The method of claim 3, wherein the quantitative measurement measures the texture, intensity, or contrast of the corresponding candidate as shown in the image.

5. The method of claim 3, wherein the quantitative measurement measures the size or shape of the corresponding candidate as shown in the image.

6. The method of claim 1, wherein the classification of the candidate of interest takes into consideration the distance from the candidate of interest to the one or more candidates within the subset.

7. The method of claim 1, the method comprising acquiring the image via a medical imaging system.

8. A method of classifying a candidate of interest within a medical image, the method comprising:
   determining correlations and differences between locations of a subset of one or more candidates within an image, the subset either excluding or including the candidate of interest being classified; and
   classifying the candidate of interest using the correlations and differences determined along with a location and one or more descriptive features of the candidate of interest.

9. The method of claim 8, the method comprising determining correlations and differences between descriptive features of the subset of one or more candidates, wherein the classification of the candidate of interest also accounts for the correlations and differences between the descriptive features of the subset.

10. The method of claim 8, wherein the one or mores descriptive features are automatically generated from one or more corresponding quantitative measurements of the candidate of interest as shown in the image.

11. The method of claim 10, wherein the quantitative measurements measure the shape, intensity, contrast, and/or smoothness of the candidate of interest as shown in the image.

12. The method of claim 8, wherein the classification of the candidate of interest accounts for the distance between the candidate of interest and each of the one or more candidates within the subset.

13. The method of claim 8, the method comprising acquiring the image via a medical imaging system.

14. A data processing system for classifying a candidate of interest within a medical image, the system comprising:
   a processor operable to determine correlations and differences between (1) locations of a subset of candidates within an image, the subset either excluding or including the candidate of interest being classified, and (2) descriptive features associated with the subset of candidates, wherein the processor classifies the candidate of interest using the correlations and differences determined in (1) and (2) along with a location and at least one descriptive feature of the candidate of interests.

15. The system of claim 14, wherein the descriptive features associated with the subset of candidates are based upon quantitative measurements.

16. The system of claim 15, wherein at least one quantitative measurement measures the texture, intensity, or contrast of a corresponding candidate as shown in the image.

17. The system of claim 14, the system comprising:
   a memory operable to store the image;
   a display operable to display the image; and
   a medical imaging device operable to acquire the image.

18. The system of claim 14, wherein the processor accounts for the distance from the candidate of interest and each of the candidates within the subset.

19. A non-transitory computer-readable medium having instructions executable on a computer stored thereon, the instructions comprising:
   (1) determining correlations and differences between descriptive features of a subset of one or more candidates shown in a medical image, the subset either excluding or including a candidate of interest shown in the medical image;
   (2) determining a location and one or more descriptive features of the candidate of interest; and
   (3) classifying the candidate of interest using the information determined in (1) and (2).

20. The non-transitory computer-readable medium of claim 19, the instructions comprising determining correlations and differences between locations of the one or more candidates within the subset, wherein the classification of the candidate of interest accounts for the correlations and differences between locations determined.

21. The non-transitory computer-readable medium of claim 20, the instructions comprising acquiring the image via a medical imaging device.

* * * * *